United States Patent
Daoud (10) Patent No.: US 6,353,184 B1
(45) Date of Patent: Mar. 5, 2002

(54) LOW PROFILE ADAPTER FOR VARIABLE SIZE HEAT SHRINK TUBING JOINT

(75) Inventor: Bassel Hage Daoud, Parsippany, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/372,335

(22) Filed: Aug. 11, 1999

(51) Int. Cl.$^7$ ................................................. H02G 3/04
(52) U.S. Cl. .................. 174/65 R; 177/65 G; 177/151; 16/2.1
(58) Field of Search ............................... 174/65 G, 151, 174/152 G, 153 G, 135, 65 R; 16/2.1, 2.2, 2.3; 285/139.2, 139.3, 148.25, 192; 248/56

(56) References Cited

U.S. PATENT DOCUMENTS

| | | | |
|---|---|---|---|
| 2,383,018 A | * 8/1949 | Shere | 174/151 |
| 1,307,295 A | * 9/1961 | FRX | 174/153 G |
| 3,515,798 A | 6/1970 | Sievert | 174/135 |
| 3,866,950 A | * 2/1975 | Shock et al. | 285/4 |
| 4,211,423 A | * 7/1980 | Resech | 285/4 |
| 4,871,599 A | 10/1989 | Knorr | 428/36.9 |
| 4,913,522 A | 4/1990 | Nolf et al. | 350/96.2 |
| 5,109,756 A | * 5/1992 | Barboza et al. | 285/4 |
| 5,155,794 A | 10/1992 | Nolf et al. | 385/135 |
| 5,249,253 A | 9/1993 | Franckx et al. | 385/135 |
| 5,602,954 A | 2/1997 | Nolf et al. | 385/135 |
| 5,670,223 A | 9/1997 | Sadlo et al. | 428/34.9 |
| 5,803,292 A | 9/1998 | Daoud | 220/4.02 |
| 5,907,127 A | 5/1999 | Daoud | 174/57 |
| 5,988,698 A | * 11/1999 | Bravo et al. | 285/139.2 |

* cited by examiner

Primary Examiner—Dean A. Reichard
Assistant Examiner—Angel R. Estrada
(74) Attorney, Agent, or Firm—Duane, Morris & Heckscher LLP (57) ABSTRACT

A building entrance protector assembly includes a building entrance protector housing having an opening. The housing includes a plurality of concentric cylindrical side walls around the opening. Each side wall at least partly overlies another one of the side walls. At least one annular surface is provided at an end of the side walls distal from the flange. The distance between the flange and each distal (annular or disk shaped) surface increases monotonically from an outermost annular surface to an innermost annular or circular surface. Each annular surface is located at a respectively different distance from the flange. Each side wall is connected to an adjacent side wall by one of the annular surfaces. One or more of the inner side walls may be cut away to accommodate a variety of cable sizes. A cable passes through an innermost one of the side walls. A heat shrink tubing secures the cable to the adapter. The heat shrink tubing is adhered to the cable and the outermost side wall. The innermost side wall has approximately the same diameter as the cable. Optionally, the housing has an adapter mounted on it. The adapter includes the side walls and the annular surface. The adapter includes a mounting flange for mounting the adapter to the housing. Alternatively, the side walls, annular surfaces and distal circular surface may be formed integrally as a part of the end cap of the housing.

6 Claims, 7 Drawing Sheets

LOW PROFILE ADAPTER FOR VARIABLE SIZE HEAT SHRINK TUBING JOINT

FIELD OF THE INVENTION

The present invention relates to telecommunications equipment generally, and more specifically to adapters for connecting a cable to an enclosure, such as a building entrance protector.

DESCRIPTION OF THE RELATED ART

A building entrance protector (BEP) enclosure houses the physical interface between the nodes of a local telecommunications network and a telecommunications cable. For example, a BEP enclosure may house the interface hardware between the telephones of an office building and an exterior telephone cable having a number of twisted copper pairs that carry the voice signals for those telephones. A BEP enclosure is typically mounted in the basement or first floor of the office building. A BEP enclosure may also be used to house the interface hardware for systems based on fiber optical communications. Similarly, BEP enclosures may be used with telecommunications systems carrying signals other than just telephone voice signals.

A BEP enclosure provides two main functions: (1) it houses the hardware that provides connections between a cable and the individual nodes (e.g., telephones) of a local network; and (2) it houses the hardware that provides electrical isolation between the cable and the local network. Electrical isolation is intended to prevent any high voltages and/or high currents that may exist from time to time in the cable from reaching the local network. For example, a BEP enclosure will house isolation components designed to protect telephone users from lightning striking a telephone cable. Such electrical isolation is typically provided by 5-pin plug-in protectors that quickly connect signals to ground upon detection of sufficiently high voltages or currents. Building entrance protectors are described in U.S. Pat. Nos. 5,803,292 and 5,907,127, which are expressly incorporated by reference herein.

The end cap of a BEP may include one or more cable ports, which extend outwardly from the end cap. The cable port allows the cable to enter into the enclosure. If the housing is to be pressurized, then heat shrink tubing is commonly used. The heat shrink tubing secures the cable to the BEP housing, aligns the cable, and provides a seal to protect the fiber enclosure from the outdoor environments.

If the cable port size is too large relative to the cable size, the cable does not remain aligned straight within the port. A wobbly cable could result in damage to the exposed fibers within the enclosure. To alleviate this problem, different sized ports may be required to maintain a firm hold on the fiber cable, typically, small, medium and large. To fit an equal number of small, medium and large ports within the limited space of the enclosure end cap, the number of any port size would be reduced to one third of the total number of cable ports.

Figure 1:
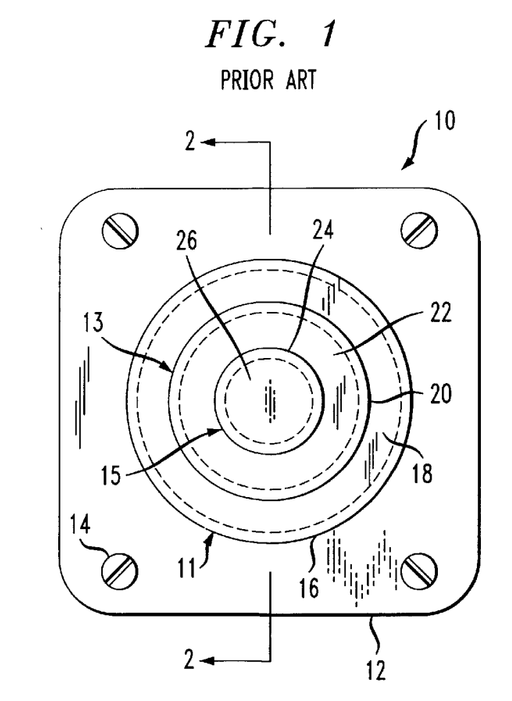
FIG. 1 is a plan view of a conventional cable adapter capable of accommodating multiple cable sizes.
Figure 2:
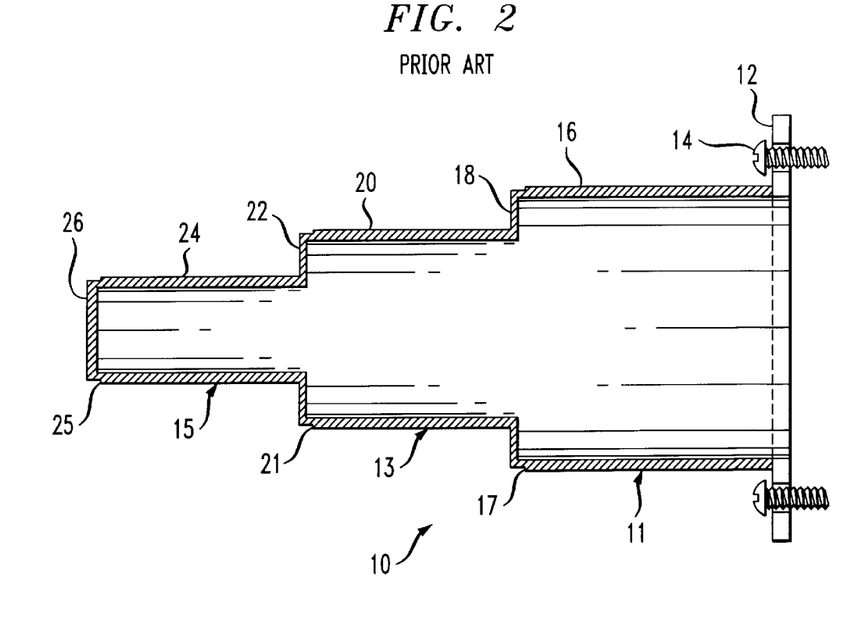
FIG. 2 is a cross sectional view of the conventional adapter of FIG. 1, taken along section line 2—2 of FIG. 1.

FIGS. 1 and 2 show a multi-size adapter 10 according to the prior art. Adapter 10 can accommodate a small, medium or large cable. Adapter 10 has three cable ports 11, 13 and 15, with respective cylindrical side walls, 16, 20 and 24. Cable ports 11, 13 and 15 are sized to accommodate large, medium (not shown) and small (not shown) cables respectively. For each cable size, a different portion of adapter 10 is cut away to leave an appropriately sized cable port 11, 13 or 15 for the cable being accommodated.

Figure 3:
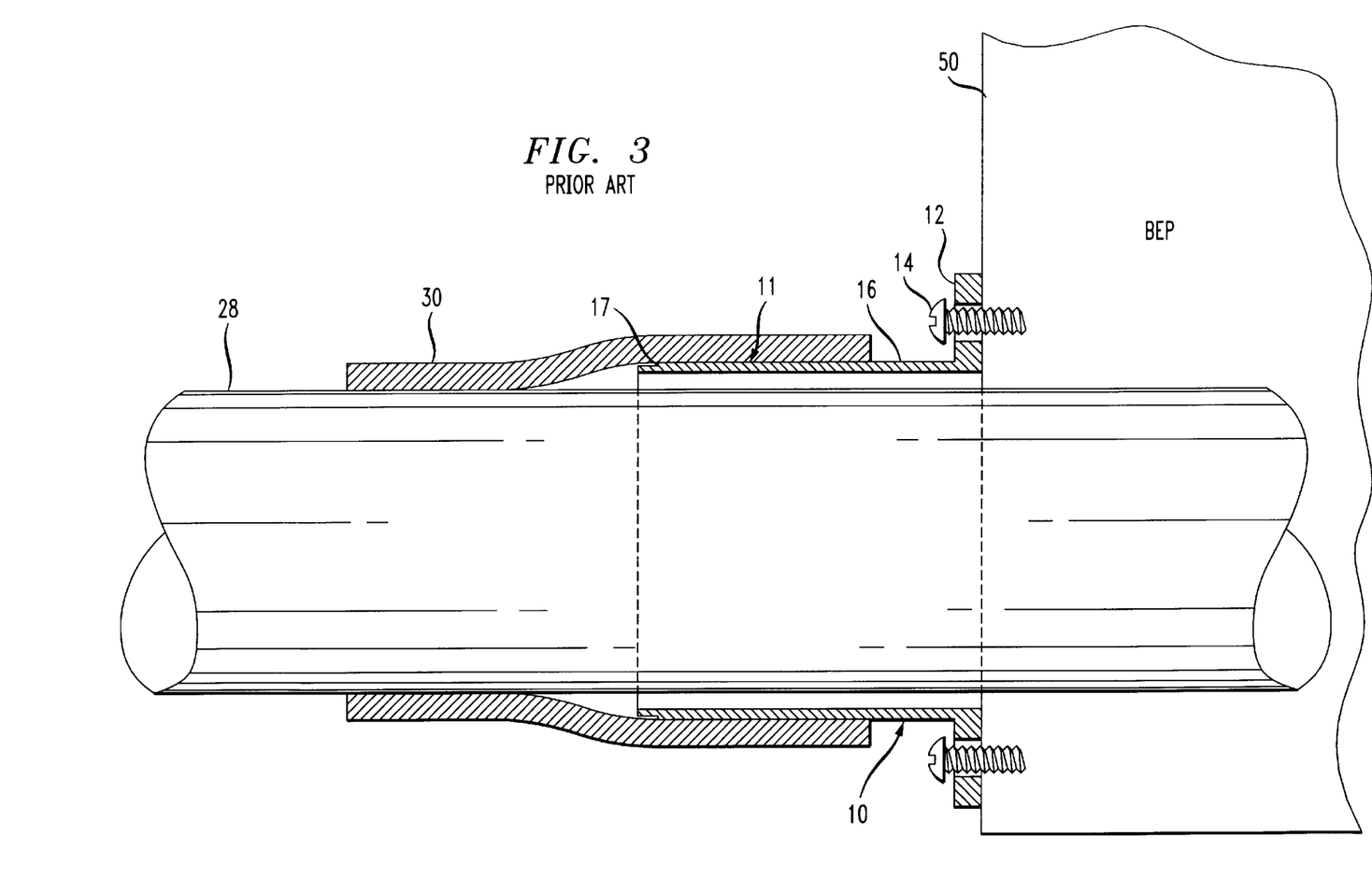
FIG. 3 is a cross sectional view of a conventional BEP assembly including the adapter of FIG. 2, after removing the small and medium diameter cable ports and securing a cable to the adapter.

For example, FIG. 3 shows an adapter that has been cut between the ledge 17 and the flat surface 18 to accommodate a large cable 28. The portion of the adapter 10 to the left of ledge 17 in FIG. 2 (including side walls 20 and 24, and flat surfaces 22 and 26) is cut away and discarded. The remaining portion of adapter 10 includes a mounting flange 12 and a cable port 11 having side wall 16 with a size that is matched to the cable 28 and the heat shrink tubing 30. The adapter 10 is mounted to the end cap of a BEP 50 using fasteners 14. The heat shrink tubing 30 is placed over the cable port 11. The cable 28 is fit through the heat shrink tubing 30 and the cable port 11 of adapter 10. The tubing 30 is heated, typically using a heat gun, and the tubing shrinks to form a sealed joint around the cable port 11 and the cable 28.

As best seen in FIG. 2, the adapter 10 has a length that is three times the length of an adaptor (not shown) that is designed to accommodate only a single cable size. This may be a disadvantage if, for example, it is desired to install more than one BEP 50 in a small space, or if it is desired to install a BEP near the floor. In either case, the length of the adapter 10 may exceed the available space. A more compact adapter is desired.

SUMMARY OF THE INVENTION

The present invention is an adapter for securing a cable to a housing. The adapter has a flange that is attachable to the housing. The adapter has a plurality of concentric cylindrical side walls, at least one of which is connected to the flange. Each side wall at least partially overlies an adjacent one of the plurality of side walls. The adapter has a plurality of annular surfaces. Each side wall is connected to an adjacent side wall by one of the plurality of annular surfaces.

BRIEF DESCRIPTION OF THE DRAWINGS

The drawings of this application are not drawn to scale. In particular, several dimensions are exaggerated to improve the readability of the drawings.

DETAILED DESCRIPTION

Figure 4:
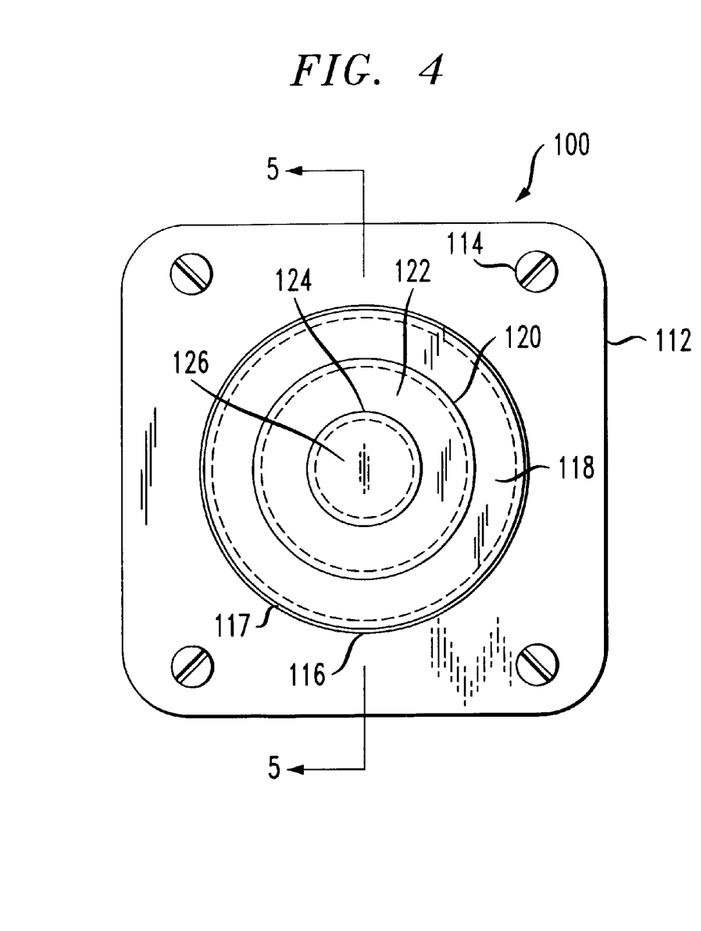
FIG. 4 is a plan view of an exemplary adapter according to the present invention.
Figure 5:
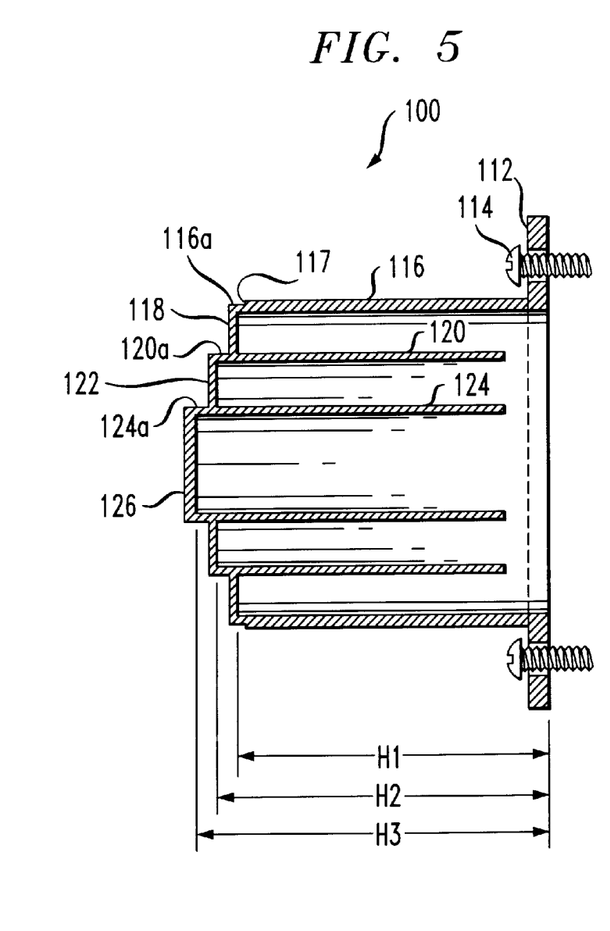
FIG. 5 is a cross sectional view of the adapter of FIG. 4, taken along section line 5—5 of FIG. 4.

FIGS. 4 and 5 show an exemplary adapter 100 according to the invention. The adapter 100 is used to secure a cable 128 to a housing 150. The adapter 100 is advantageous for securing any of a variety of cable sizes to the housing 150 with heat shrink tubing 130. Unlike the adapters of the prior art, adapter 100 has overlapping cylindrical side walls 116, 120 and 124, providing a lower profile. The lower profile allows the adapter to fit into smaller spaces without any loss of function. For the exemplary configuration shown in FIGS. 4 and 5, the height H3 of the adapter is approximately one third (⅓) of the height of the conventional adapter 10 shown in FIGS. 1 and 2. Nevertheless, adapter 100 provides a small gap size between the inside diameter of the adapter and a variety of differently sized cables, allowing formation of a heat shrink joint that can withstand over 50 ft.-lb. (67.8 m-N) of torque.

The adapter 100 has a flange 112 that is attachable to the housing 150. The adapter 100 has a plurality of concentric cylindrical side walls 116, 120, and 124, at least one of which is connected to the flange 112. Each side wall 116, 120, 124 at least partially overlies an adjacent one of the plurality of side walls. In the exemplary embodiment, side wall 120 overlaps (overlies and extends beyond) side wall 116, and side wall 124 overlaps side wall 120.

The adapter has a plurality of annular surfaces 118 and 122. Each annular surface 118 and 122 is positioned at an end of a respective side wall 116 and 120 that is distal from the flange 112. Each side wall 116, 120 and 124 is connected to an adjacent side wall by one of the plurality of annular surfaces 118 and 122. For example, side wall 116 is connected to side wall 120 by annular surface 118. Side wall 120 is connected to side wall 124 by annular surface 122.

Advantageously, each of the inner cylindrical side wall 120, 124 is only attached at its distal end, so that the adapter 100 can be cut to accommodate the appropriate cable size after the adapter is installed on the housing 150.

In addition to the annular surfaces 118 and 122, the innermost cylinder 124 has a flat circular surface 126 at the distal end of the side wall. Surface 126 is located further from the flange 112 than the annular surfaces 118 and 122. If the adapter 100 is installed on the BEP housing 150 before a cable is installed in the adapter, the combination of the cylindrical side walls 116, 120, 124, the annular surfaces 118, 122 and the circular surface 126 form a sealed adapter, so that the BEP 150 can be pressurized. If the adapter is only to be mounted to the housing when a cable is to be sealed to the adapter, then the adapter need not have the surface 126, and an adapter formed without surface 126 would perform the same function.

Each annular surface 118, 122 and disk 126 is located at a respectively different distance H1, H2, H3 from the flange 112. In the exemplary embodiment, the distance from the flange 112 increases monotonically from an outermost annular surface 118 (distance=H1) to an innermost annular surface 122 (distance=H2) and to the inner disk 126 (distance=H3).

Preferably, the side walls 116, 120 and 124 in each pair of successive side walls differ from each other in height by at least a thickness of a blade 160, 170, 180 (FIG. 9) used to cut unused ones of the plurality of side walls from the adapter 100. That is, the differences (H3-H2) and (H2-H1) are each sufficient so that one or more of the cylinders can be severed by cutting a portion of the distal end of adapter 100. Preferably, the distance in height is small relative to the height of the cylindrical walls, so that the overall height H3 of the adapter 100 is small.

In the exemplary embodiment, at least one side wall 116 has a ledge 117 thereon, proximate to the end of the side wall 116 distal from the flange 112. The annular surfaces 118, 122 and ledge 117 are discussed below with reference to the method for using the adapter 100 to secure a cable 128.

Figure 9:
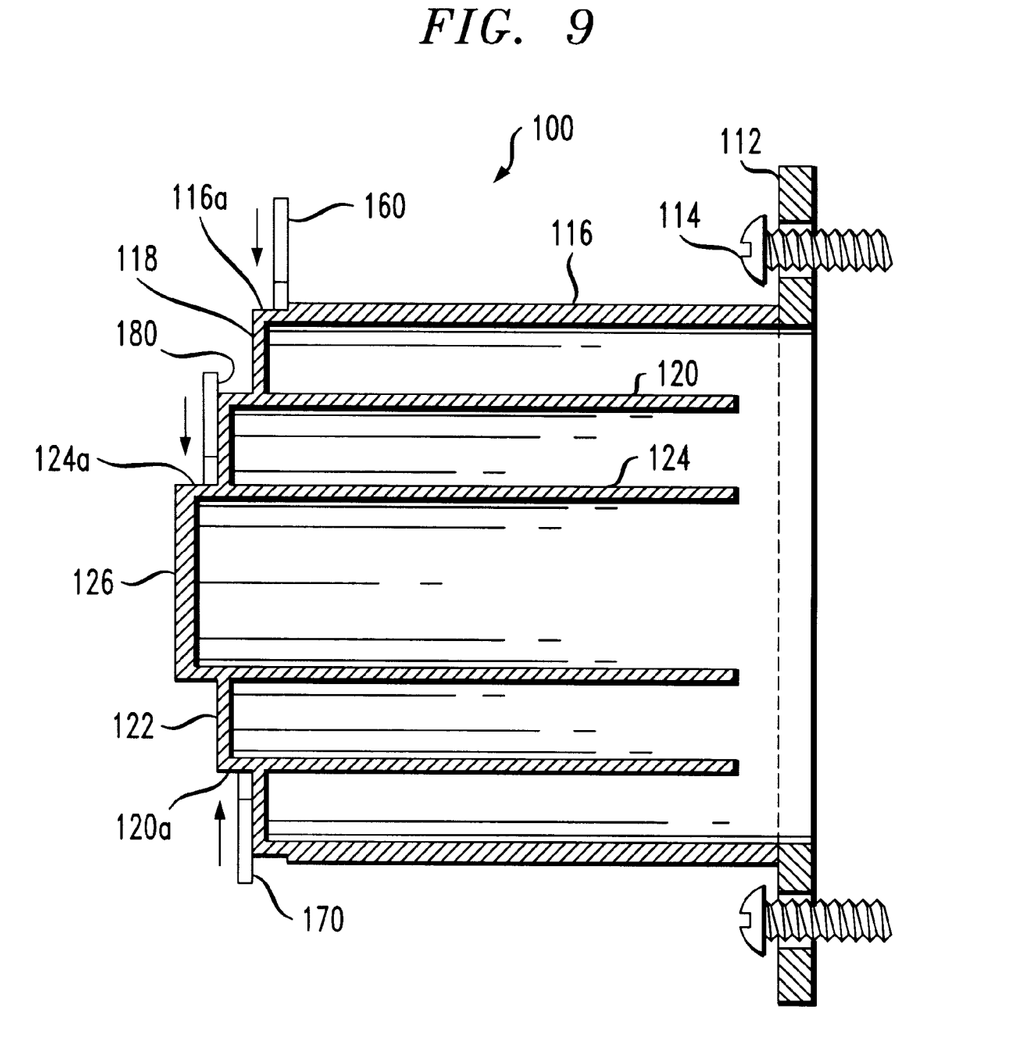
FIG. 9 shows three blade positions that are used to cut the adapter to any of the configurations of FIGS. 6–8.

The adapter 100 may be made of any rigid material that is easy to cut. Exemplary materials include polymers, such as polycarbonate and polyvinyl chloride. These materials are easily cut in the field with a saw 160, 170 or 180 (FIG. 9). Although metal may also be used, metal is more difficult to cut with manual tools.

Figure 6:
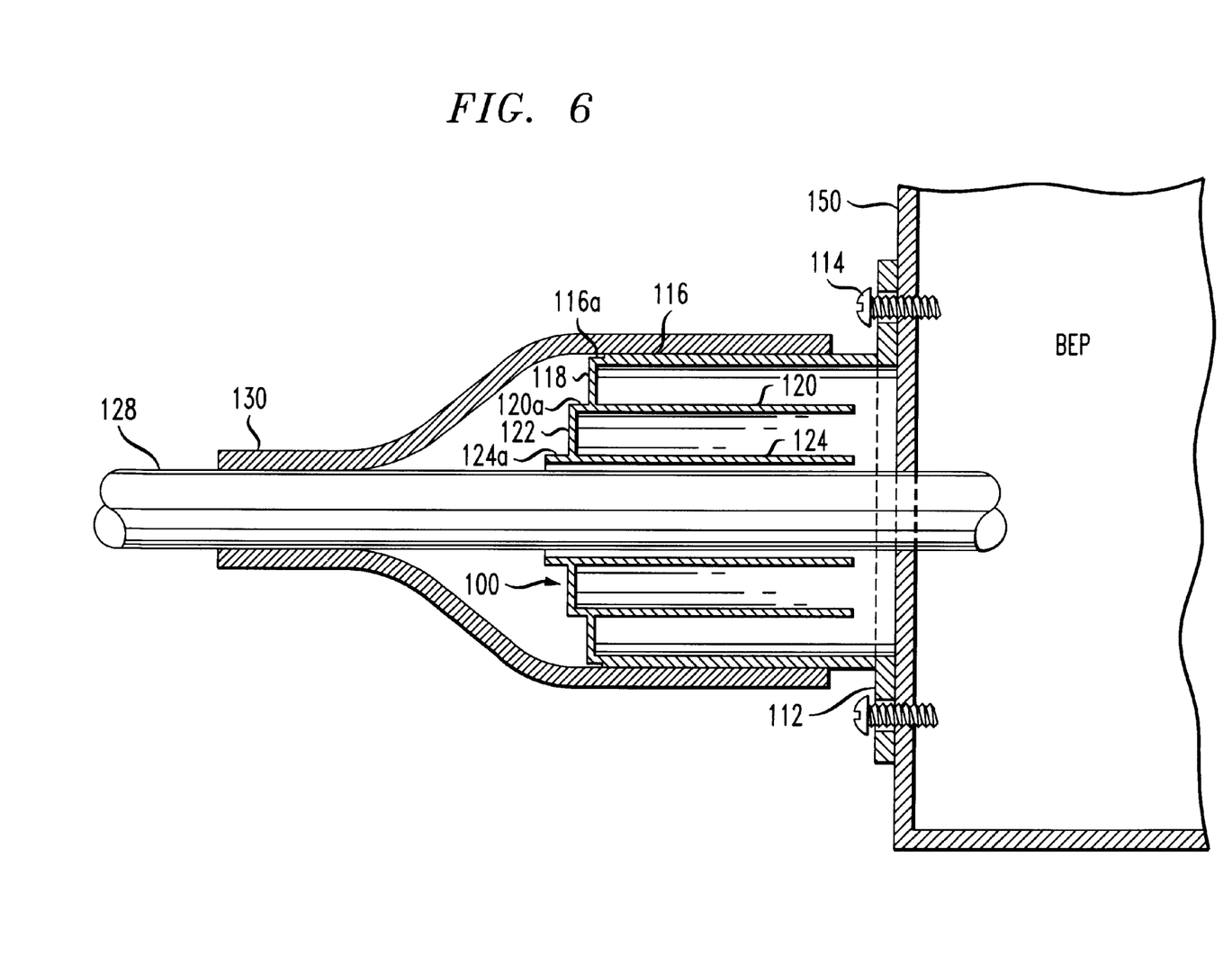
FIG. 6 is a cross sectional view of a BEP assembly including the adapter of FIG. 4, after removing the small disk shaped surface from the distal end to accommodate a small cable.
Figure 7:
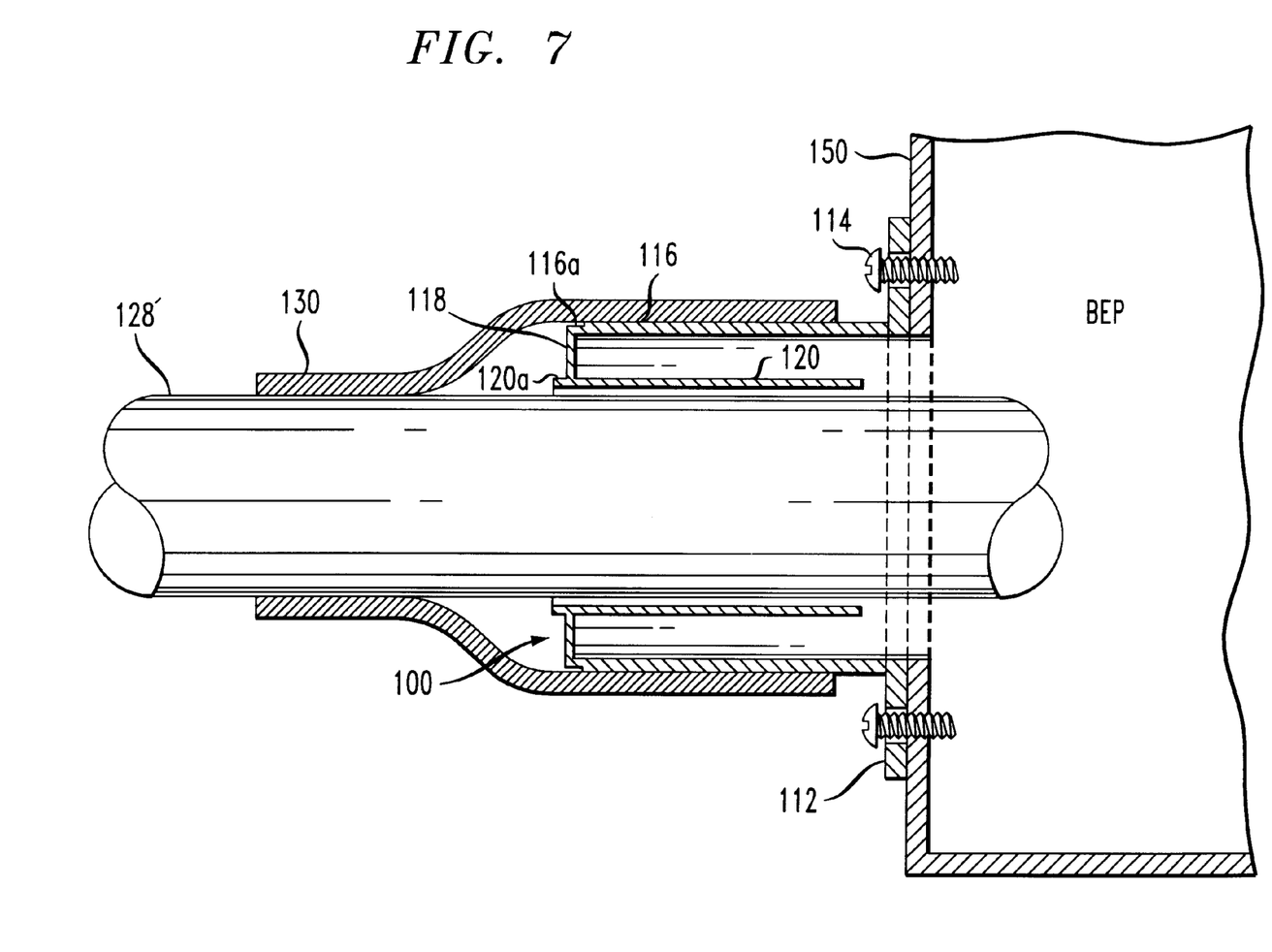
FIG. 7 is a cross sectional view of a BEP assembly including the adapter of FIG. 4, after removing the small and medium flat surfaces and small cylindrical side wall to accommodate a medium cable.
Figure 8:
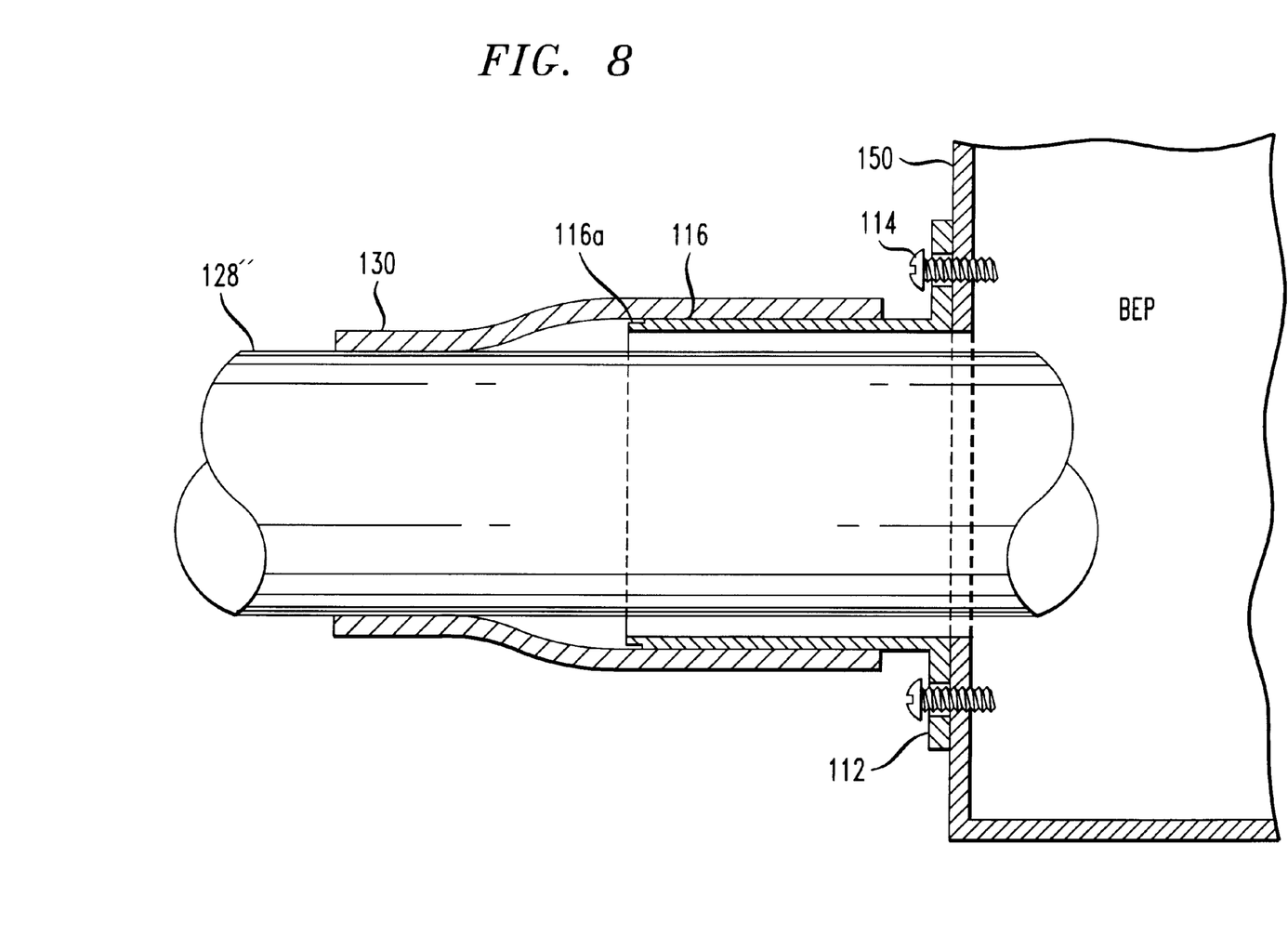
FIG. 8 is a cross sectional view of a BEP assembly including the adapter of FIG. 4, after removing the small, medium and large flat surfaces and small and medium cylindrical side walls to accommodate a large cable.

FIGS. 6, 7 and 8 show three different configurations into which adapter 100 may be cut to accommodate three respective cable sizes. In each case, a portion of a selected one of the side walls 116, 120 or 124 is cut, so as to remove any side wall that is smaller in diameter than the selected side wall. Then, the cable is secured to the side wall 116 having the largest diameter. Once the adapter 100 is properly cut, the innermost remaining side wall has approximately the same diameter as the cable. A small clearance is allowed between the inner diameter of the adapter and the sheathing of the cable, so that the inner wall of the adapter guides the cable without forming an interference fit.

FIG. 6 shows the configuration of the adapter 100 for securing a small cable 128 to the BEP housing 150. The distal end 124a of innermost cylindrical side wall 124 is cut (using a knife or saw), severing the circular flat surface 126. In this configuration, the adapter 100 now has an inner diameter sized to accommodate the small sized cable 128. Because the adapter wall 124 has a minimal clearance around the cable 128, the cable alignment is maintained, and the cable cannot wobble or work itself loose. The heat shrink tubing 130 has a wide range of shrinkage capability, and can shrink at one end to grip a small diameter cable 128 at the same time that the other end of the tubing 130 grips a relatively large adapter surface 116.

As noted above, the drawings are not to scale. In particular, the configuration of FIG. 6, has the greatest difference between the outer diameter of side wall 116 and the diameter of the cable 128. This gap about 0.1 inch (2.5 mm)

FIG. 7 shows the configuration of the adapter 100 for securing a medium cable 128' to the BEP housing 150. The distal end 120a of the middle cylindrical side wall 120 is cut (using a knife or saw), severing the wall 120. In this configuration, the adapter 100 now has an inner diameter sized to accommodate the medium sized cable 128'. Again, the adapter wall 120 has a minimal clearance around the cable 128', so the cable alignment is maintained, and the cable cannot wobble or work itself loose.

FIG. 8 shows the configuration of the adapter 100 for securing a large cable 128" to the BEP housing 150. The distal end 116a of the outermost cylindrical side wall 116 is cut (using a knife or saw), severing the wall 116. In this configuration, the adapter 100 now has an inner diameter sized to accommodate the large sized cable 128". As in the case of the small and medium cables 128 and 128', the adapter wall 116 has a minimal clearance around the cable 128", so the cable alignment is maintained, and the cable cannot wobble or work itself loose.

FIG. 9 shows three different blade positions, indicated by blades 160, 170 and 180. The adapter 100 can be cut to accommodate a cable by aligning a blade on one of the annular surfaces that is adjacent to the selected side wall and is connected to the selected side wall at an inner circumference of that annular surface, and cutting the selected side wall with the aligned blade. For example, to accommodate a small cable, the blade 180 is aligned on annular surface 122 (which is adjacent to the side wall 124 to be cut), and the end 124a of side wall 124 is cut. Similarly, to accommodate a medium cable, the blade 170 is aligned on annular surface 118, and the end 120a of side wall 120 is cut.

In the case of a large diameter cable, the adapter 100 is prepared by aligning the blade 160 on a ledge 117 of the selected side wall 116, and cutting the selected side wall with the aligned blade.

Either before or after the adapter 100 is cut to accommodate the selected cable size, the adapter is fastened to the housing 150 by driving fasteners 114 through the flange 112 connected to the outermost cylindrical wall side 116. After the adapter is cut and the adapter is fastened to the housing 150, the cable 128, 128' or 128" is inserted through the selected cylindrical wall 124, 120 or 116, respectively. A heat-shrink tubing 130 is fit over the outermost cylindrical wall 116 and over a portion of the cable 128, 128' or 128" protruding through the selected cylindrical wall. The heat-shrink tubing 130 is then heated to form a seal over the outermost cylindrical wall 116 and the portion of the cable 128, 128' or 128". The heat shrink tubing 130 is adhered to the cable 128, 128' or 128" and the outermost side wall 116.

Although the exemplary adapter includes three cable ports, it is contemplated that adapters according to the present invention may be formed to accommodate any number of cable sizes, by adding additional cylindrical side walls, and connecting distal annular flat surfaces.

Although the exemplary housing 150 is a building entrance protector housing, the invention may be practiced to secure a cable to other types of housings, to form a high pressure seal. Although the exemplary cables 128, 128' and 128" have optical fibers therein, the invention may be used to secure other types of cables to a housing. Although the invention is advantageous for housings subjected to high pressure, it may also be used for securing a cable to a housing that is not pressurized.

Although the exemplary embodiment includes an adapter that is separate and distinct from the BEP housing 150, the adapter may be formed integrally as a portion of the end cap of the BEP housing, in which case the end cap and adapter form a single component.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A method for securing a cable to a housing, comprising the steps of:
   (a) providing a housing having an opening with a plurality of concentric cylindrical side walls adjacent the opening, each side wall at least partially overlying an adjacent one of the plurality of side walls, the housing having at least one annular surface, each side wall connected to an adjacent side wall by a respective annular surface, at least one of said side walls having a ledge thereon;
   (b) aligning a blade on a ledge of a selected side wall;
   (c) cutting a portion of the selected side wall with the aligned blade, so as to remove any side wall that is smaller in diameter than the selected side wall; and
   (d) securing the cable to the side wall having the largest diameter.

2. The method of claim 1, wherein step (d) includes:
   inserting the cable through the selected cylindrical wall;
   fitting a heat-shrink tubing over the outermost one of the cylindrical walls and over a portion of the cable protruding through the selected cylindrical wall; and
   heating the heat-shrink tubing to form a seal over the outermost cylindrical wall and the portion of the cable.

3. The method of claim 1, wherein step (a) includes fastening an adapter to the housing, the adapter including the plurality of side walls and a mounting flange connected to an outermost one of the side walls.

4. The method of claim 3, wherein said ledge is at an end of said at least one side wall distal from said flange.

5. The method of claim 1, wherein said concentric cylindrical side walls are rigid.

6. The method of claim 1, wherein said concentric cylindrical side walls are fixed.

* * * * *